(12) United States Patent
Chak et al.

(10) Patent No.: US 11,448,190 B2
(45) Date of Patent: Sep. 20, 2022

(54) SYSTEM FOR SUPPLYING ELECTRONIC POWER

(71) Applicants: Mark Chak, Brooklyn, NY (US); Alexander Chak, Brooklyn, NY (US)

(72) Inventors: Mark Chak, Brooklyn, NY (US); Alexander Chak, Brooklyn, NY (US)

( * ) Notice: Subject to any disclaimer, the term of this patent is extended or adjusted under 35 U.S.C. 154(b) by 103 days.

(21) Appl. No.: 16/873,852

(22) Filed: Jul. 28, 2020

(65) Prior Publication Data
US 2022/0034301 A1 Feb. 3, 2022

(51) Int. Cl.
*F03D 9/00* (2016.01)
*H02P 9/04* (2006.01)
*F03D 9/22* (2016.01)
*F01K 25/08* (2006.01)
*F03D 9/32* (2016.01)

(52) U.S. Cl.
CPC ............. *F03D 9/22* (2016.05); *F01K 25/08* (2013.01); *F03D 9/32* (2016.05)

(58) Field of Classification Search
CPC ............. F01K 25/08; F03D 9/22; F03D 9/32
See application file for complete search history.

(56) References Cited

U.S. PATENT DOCUMENTS

| | | | | |
|---|---|---|---|---|
| 3,876,925 A * | 4/1975 | Stoeckert | ............... | B60L 8/006 322/1 |
| 4,237,384 A * | 12/1980 | Kennon | ............... | F03D 13/20 290/55 |
| 4,314,160 A * | 2/1982 | Boodman | ............... | B60K 25/04 290/55 |
| 5,280,827 A * | 1/1994 | Taylor | ............... | F03D 3/0454 180/165 |
| 5,296,746 A * | 3/1994 | Burkhardt | ............... | B60L 8/006 290/55 |
| 5,680,032 A * | 10/1997 | Pena | ............... | B60K 6/105 290/52 |
| 5,844,324 A * | 12/1998 | Spriggle | ............... | F03D 13/20 290/55 |
| 6,897,575 B1 * | 5/2005 | Yu | ............... | F03D 13/20 290/44 |
| 10,358,038 B1 * | 7/2019 | Ripley | ............... | H02J 7/32 |
| 2003/0052487 A1 * | 3/2003 | Weingarten | ............... | F03D 9/255 290/54 |
| 2005/0001433 A1 * | 1/2005 | Seelin | ............... | G09F 21/048 290/44 |
| 2005/0046195 A1 * | 3/2005 | Kousoulis | ............... | F03D 9/11 290/44 |
| 2006/0273596 A1 * | 12/2006 | Durbin | ............... | F03D 3/002 290/54 |

* cited by examiner

Primary Examiner — Tulsidas C Patel
Assistant Examiner — Thomas K Quigley

(57) ABSTRACT

A system for supplying electric power has at least one moving vehicle, a rotary element provided in the moving vehicle and rotatable by a wind when the moving vehicle is moving, at least one electrical battery provided in the moving vehicle and charging components of the moving vehicle, at least one electrical generator having a rotor connected with and rotatable by the rotary element when the rotary element is rotated during moving of the moving vehicle, so as to generate electric current, and an electrical connection for electrically connecting the electrical generator with the at least one electrical battery so that the at least one electrical battery is charged by the electric current generated by the electrical generator.

2 Claims, 3 Drawing Sheets

SECTION A-A

VIEW I

SYSTEM FOR SUPPLYING ELECTRONIC POWER

BACKGROUND OF THE INVENTION

The present invention relates to systems for supplying an electric power.

A plurality of systems for generating an electric power from wind, having different designs, operating on different principles and supply electric power to different consumers are currently known in various industries and technical fields. It is believed that it advisable to develop another system for generating an electric power from wind, which can be used in particular for example for supplying an electric power to moving vehicles.

SUMMARY OF THE INVENTION

Accordingly, it is an object of the present invention to provide a new system for supplying an electric power, which is especially suitable for satisfying electric power needs of moving vehicles of various type.

In keeping with these objects and with others which will become apparent hereinafter, one features of the present invention resides, briefly stated in a system for supplying electric power, which has at least one vehicle, a rotary element provided in the vehicle and rotatable by a wind when the vehicle is moving, at least one electrical battery provided in the vehicle and operative for charging components of the vehicle, at least one electrical generator having a rotor connected with and rotatable by the rotary element when the rotary element is rotated during moving of the vehicle, so as to generate electric current, and means for electrically connecting the electrical generator with the at least one electrical battery so that the at least one electrical battery is charged by the electric current generated by the electrical generator.

When the system for supplying electric power is designed in according with the present invention the electric power is actually generated by an electrical wind generator installed in the vehicle and exposed to a wind, and the thusly generated electric power is supplied to the electrical battery of the same vehicle to continuously charge the electrical battery which supplies components of the vehicle with the electric power, thus keeping the electrical battery always charged.

According to a further feature of the present invention in the inventive system for supplying electric power the electrical wind generator is arranged in an area of the vehicle, which is exposed to a wind both in a stationary position of the moving vehicle and during movement of the moving vehicle.

According to still a further feature of the present invention in the inventive system for supplying electric power the means for electrically connecting the electrical wind generator with the at least one electrical battery can include electrically conducting wire means extending inwardly of the vehicle.

According to still a further feature of the present invention in the inventive system for supplying electric power the moving vehicle is a vehicle selected from the group consisting of a land vehicle, a flying vehicle, a water moving vehicle.

According to still a further feature of the present invention in the inventive system for supplying electric power the moving vehicle has a side exposed to an action of a wind, and rotary element provided in the moving vehicle and rotatable by a wind when the moving vehicle is moving is arranged on the side exposed to an action of a wind.

According to still a further feature of the present invention in the inventive system for supplying electric power the moving vehicle has a roof exposed to an action of a wind, and rotary element provided in the moving vehicle and rotatable by a wind when the moving vehicle is moving is arranged on the roof exposed to an action of a wind.

According to still a further feature of the present invention in the inventive system for supplying electric power the moving vehicle has more than one electrical battery, and when of the batteries is fully charged, the generated current is supplied to another battery The novel features of the present invention are set forth in particular in the appended claims of this patent application.

The invention itself however, both as to its construction and its method of operation, will be best understood from the following description of the preferred embodiments which is accompanied by the following drawings.

DESCRIPTION OF THE PREFERRED EMBODIMENTS

A system for generating electricity according to the present invention is provided for generating electricity or electric current in association with moving vehicles, and to be used in moving vehicles. The moving vehicles in accordance with the present invention can be land vehicles such as cars, trucks, busses etc., flying vehicles such as airplanes, helicopters, drones, other pilotless flying devices, water vehicles such as boats, ships etc.

When the moving vehicle has a side exposed to an action of a wind, the system for generating electricity according to the present invention can be arranged on the side exposed to an action of a wind. When the moving vehicle has a roof exposed to an action of a wind, The system for generating electricity according to the present invention can be arranged on the roof exposed to an action of a wind.

Figure 1:
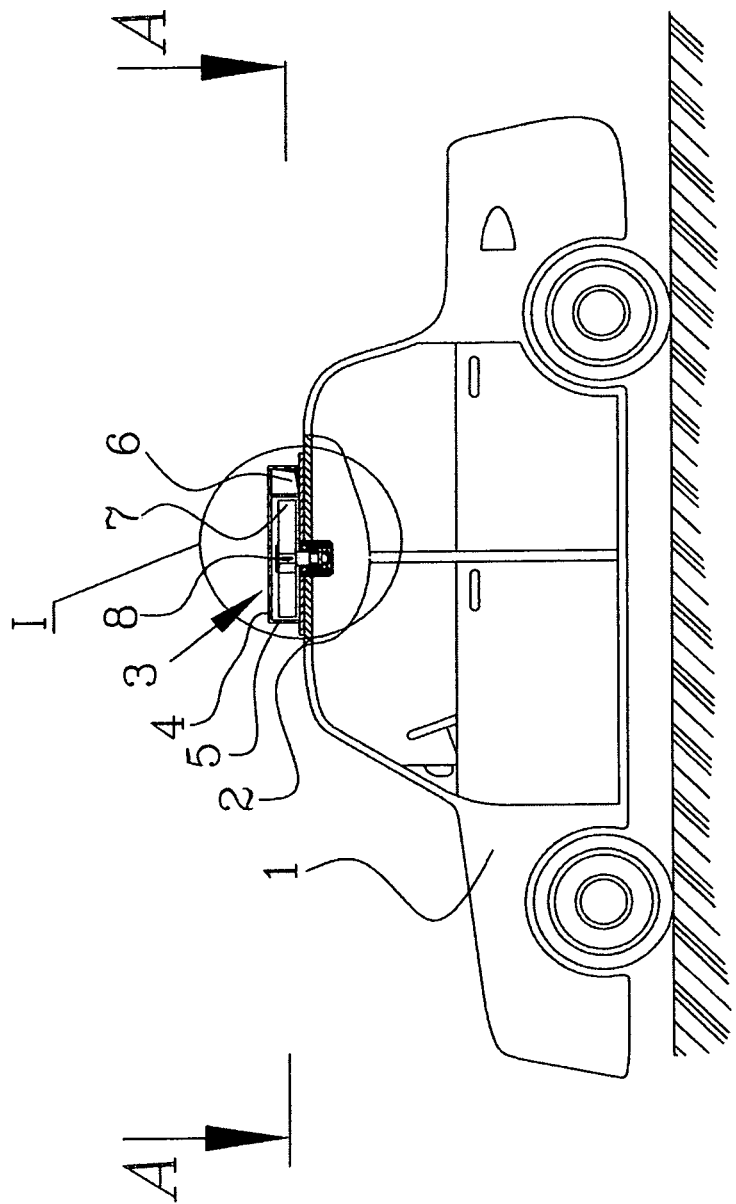
FIG. 1 of the drawing is a side view of a vehicle provided with a system for supplying electric power according with the present invention.
Figure 2:
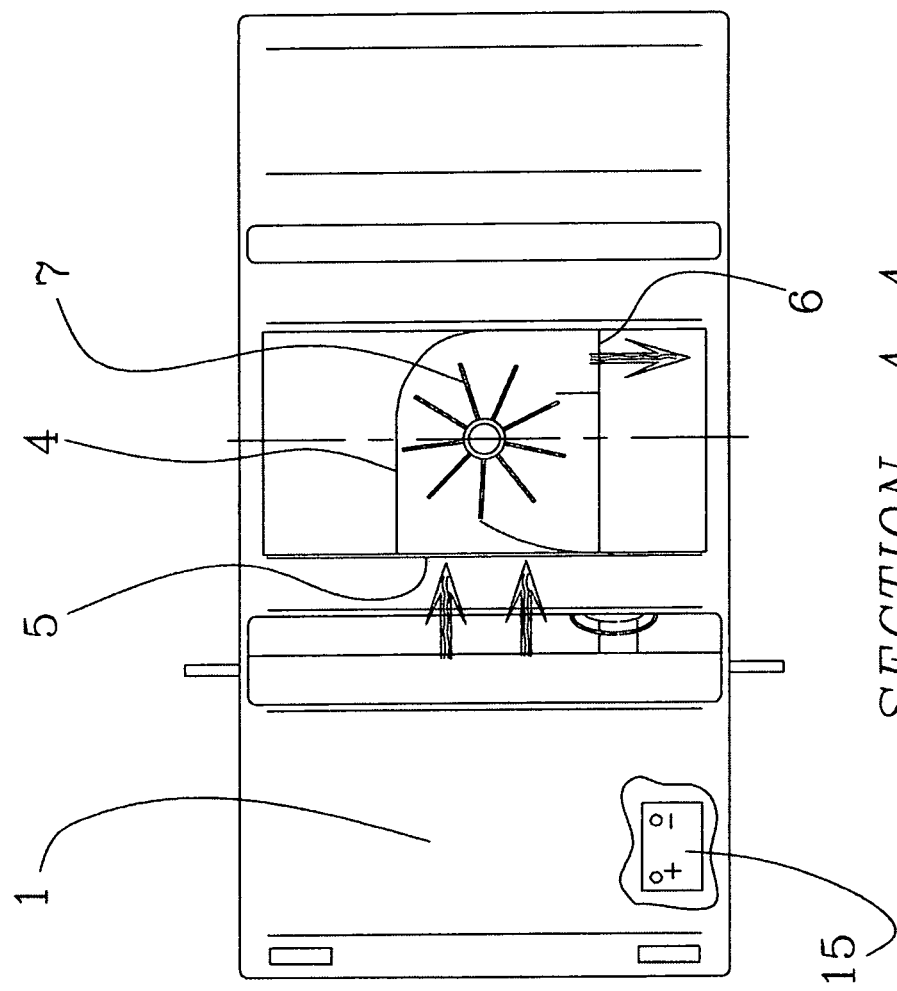
FIG. 2 of the drawing is a view from above of the vehicle provided with the system for supplying electric power according with the present invention.
Figure 3:
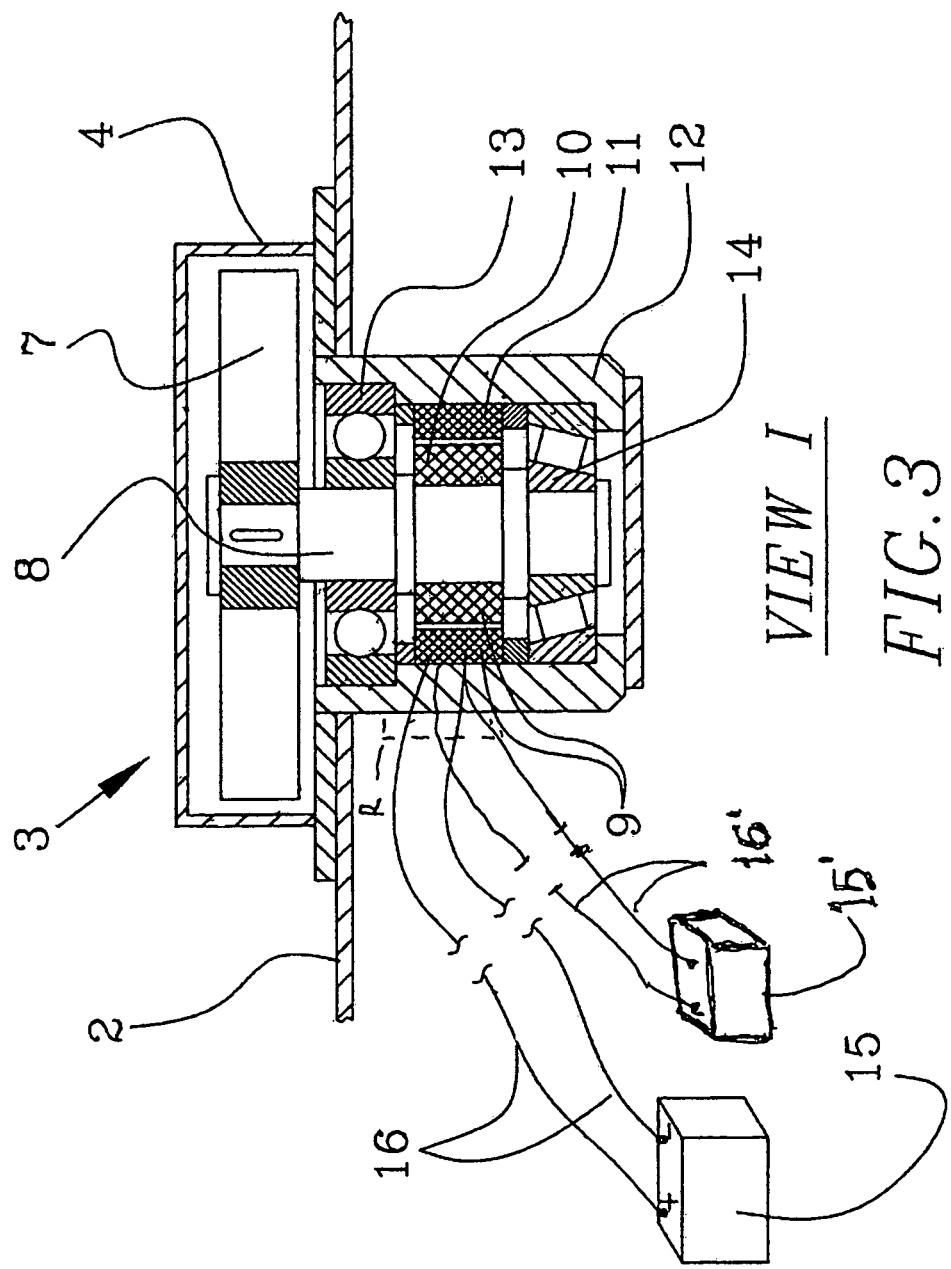
FIG. 3 is a view showing a vertical cross section of a part of the vehicle provided with the system for supplying electric power according with the present invention.

A system for generating electricity according to the present invention shown in FIG. 1 is described in association with a moving vehicle formed as a car. A vehicle is identified as a whole with reference numeral 1 and has a roof 2.

A wind guiding unit 3 is arranged on the roof 2 of the vehicle 1 and has a casing 4 with a wind inlet 5 and a wind outlet 6. A rotary element 7, such as for example a fan wheel, is located inside the wing guiding unit 3. A shaft 8 is connected with the rotary element 7 and rotates together with the latter. When the vehicle travels forwards, wind enters the casing 4 of the wind guiding unit 3 through the inlet 5, rotates the rotary element 7 with the shaft 8, and exits through wind the outlet 6.

The system for generating electricity of the invention further is provided with an electric generator 9. The electrical generator 9 has a rotatable rotor 10 which is fixedly connected to the shaft 8 of the wind guiding unit 3 for a joint rotation with it, and an immovable stator 11 fixed in a housing 12. Corresponding bearings 13 and 14 are further provided to allow the rotation of the shaft 8 with the rotor 10.

When the wind during moving of the vehicle 1 rotates the rotary element 7 of the wind guiding unit 3 with its shaft 8, the rotatable rotor 10 arranged on the shaft 8 rotates relative to the stator 11 and the electrical generator 9 generates an electric current.

The system for generating electricity of the invention further has an electrical battery or accumulator 15 located inside the vehicle 1 and provided for electrically charging of corresponding components of the vehicle. The electrical battery 15 is electrically connected with an electrical generator 9, and in particular with its stator 11, by electrical wires 16. As a result, during moving of the vehicle 1 and when the rotor 10 of the electrical generator 9 is rotated by the shaft 8 of the wind guiding unit 3 relative to the stator 11.

The system for generating electricity of the invention further can have another electrical battery or accumulator 15' located inside the vehicle 1 and provided for electrically charging of corresponding components of the vehicle. The electrical battery 15' is electrically connected with an electrical generator 9, and in particular with its stator 11, by electrical wires 16'. When one of the electrical batteries or accumulators is fully charged a switching device for example formed as a schematically shown and well know relay R provides that the electric current is supplied to another battery.

A shaft 5 of the rotary element 4 of the wind guiding unit 3 is fixedly connected by any known connection not shown in detail, to the rotor 6 of the electrical generator 7. During the operation when the rotary element 7 of the wind guiding unit 3 is rotated with its shaft 8 under the action of wind, its shaft 8 rotates the rotor 10 of the electrical generator 9. As a result, the electrical generator 9 generates electric current which is supplied through the electrical wires 16 to the electrical battery or accumulator 15 to charge the latter.

The features of the present invention are not limited to the details shown since they can be modified or replaced in any way without departing from the spirit of the invention.

What is desired to be protected by a Letters Patent based on this patent application is set forth in particular in the appended claims.

What I claim is:

1. A system for supplying electric power, comprising
a moving vehicle having a roof exposed to an action of a wind;
a wind guiding unit arranged on the roof of the moving vehicle and having a casing with a wind inlet and a wind outlet;
a rotary element located inside the casing and rotatable under the action of a wind entering the casing through the wind inlet of the casing and exiting through the wind outlet of the casing when the moving vehicle travels forwards;
a housing accommodated completely in the moving vehicle;
a shaft supporting the rotary element in the casing and extending into the housing;
an electrical generator accommodated in the housing and having an immovable stator fixed in the housing and surrounding in the housing a rotatable rotor accommodated in the housing, connected with the rotary element for joint rotation with the rotary element and rotatable relative to the stator in the housing during moving of the motor vehicle so as to generate electric current;
two roller bearings spaced from each other in a direction of elongation of the shaft and located inside the housing around the rotor and at both sides of the rotor as considered in a direction of its elongation thus allowing a rotation of the rotor in the housing;
electrical batteries provided in the moving vehicle and operative for charging components of the moving vehicle; and
means for electrically connecting the electrical generator with the electrical batteries so that the electrical batteries are charged by the electric current generated by the electrical generator during moving of the vehicle and the rotation of the rotatable rotor connected with the rotary element located inside the casing and rotatable under the action of a wind entering the casing through the wind inlet and exiting the casing through the wind outlet.

2. A system for supplying electric power of claim 1, wherein said casing has a front wall and two side walls extending transversely to the front wall as considered in a direction of movement of the moving vehicle, said wind inlet being provided in the front wall, and said wind outlet being provided in one of the side walls extending transversely to the front wall.

\* \* \* \* \*